United States Patent [19]

Lampadarios

[11] 4,054,509

[45] Oct. 18, 1977

[54] PROCESS FOR CATALYTIC CONVERSION

[75] Inventor: George V. Lampadarios, Baltimore, Md.

[73] Assignee: Atlantic Richfield Company, Philadelphia, Pa.

[21] Appl. No.: 662,189

[22] Filed: Feb. 27, 1976

Related U.S. Application Data

[62] Division of Ser. No. 531,578, Dec. 11, 1974, Pat. No. 3,976,433.

[51] Int. Cl.$^2$ .............................................. C10G 11/18
[52] U.S. Cl. .................................... 208/148; 208/150; 208/153
[58] Field of Search .............. 208/148, 153, 164, 150; 23/288 S

[56] References Cited

U.S. PATENT DOCUMENTS

| | | | |
|---|---|---|---|
| 2,328,178 | 8/1943 | Teter | 208/153 |
| 2,515,369 | 7/1950 | Degnen | 208/153 |
| 2,908,630 | 10/1959 | Friedman | 208/153 |
| 3,041,273 | 6/1962 | Smith et al. | 208/153 |
| 3,502,574 | 3/1970 | Baillie | 208/148 |
| 3,838,036 | 9/1974 | Stine et al. | 208/153 |

Primary Examiner—Herbert Levine
Attorney, Agent, or Firm—Frank J. Uxa

[57] ABSTRACT

A catalytic reactor in which feed, catalyst and diluent gas enter the bottom of a reactor which has a cross-sectional area which does not decrease substantially, preferably which has a substantially constant cross-sectional area, from the point at which catalyst and feed first come in contact to the reactor outlet. Atop the reactor is a disengagement vessel of relatively large diameter in which the product gases are separated from the catalyst. The catalyst drops through a stripper culminating in a bend which collects catalyst to provide a seal between the reactor and a regenerator. A lift line carries the catalyst to the top of the regenerator through which the catalyst moves downward to a transfer line that returns the catalyst to the reactor. Flue gases are removed from the top of the regenerator. The transfer line culminates in a bend to collect solid catalyst, providing a seal between the regenerator and the reactor. Fluidizing gas is introduced into the transfer line by an inlet probe which can be moved vertically so that the level within the transfer line at which the gas is introduced can be varied to control the catalyst flow rate.

An improved process of catalytic hydrocarbon conversion has also been discovered.

4 Claims, 1 Drawing Figure

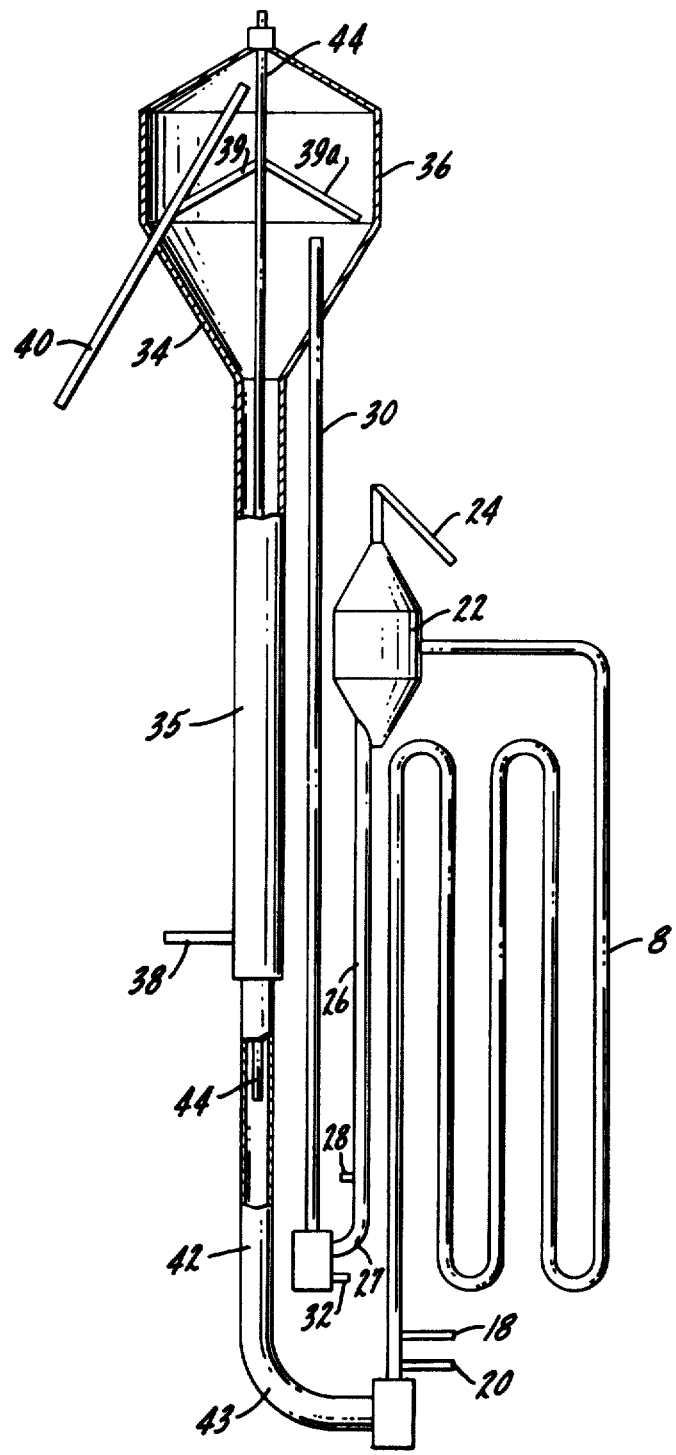

PROCESS FOR CATALYTIC CONVERSION

This is a division of application Ser. No. 531,578, filed Dec. 11, 1974 now U.S. Pat. No. 3,976,433.

The present invention relates to an improved catalytic chemical conversion unit. More particularly, the present invention relates to an improved apparatus and method for simulating progressive flow, e.g., riser, chemical reaction, e.g., catalytic hydrocarbon cracking, on a relatively small scale, e.g., laboratory.

In many instances in the chemical process industries, chemical reactions take place by contacting a catalyst, e.g., in the fluidized state, with reactants in a reaction system under substantially progressive flow conditions. For example, in the petroleum refining industry, catalytic hydrocarbon cracking of higher boiling components to lower boiling materials often takes place in the presence of fluidized cracking catalyst under substantially progressive flow conditions. Due to the configuration of many operational catalytic reaction systems, such reaction under substantially progressive flow conditions is generally termed "riser" reaction, e.g., "riser" cracking.

One problem which exists relative to such riser operations is the need to simulate this type of reaction on a small scale to test various features, e.g., process variables different catalysts and the like. This small scale testing is desirable prior to incorporating such features in a commercially sized reaction system. However, commercial operation of riser reaction systems has been found difficult to simulate on a small scale. This is especially true when the commercial reaction system also involves continuous regeneration of the catalyst, such as is often the case in catalytic hydrocarbon cracking. Thus, in small reactors in which the catalyst is passed through the reactor and transferred from the reactor to the regenerator and returned to the reactor in a cyclic manner, the regulation of the small catalyst flow rate is very difficult and leads to inadequate control of the process, especially if the flow is regulated by a valve. The relatively small pressure drops existing in such units is a significant factor making such control difficult. As an example, the differential pressure may not exceed about 1.5 psi.

Therefore, an object of the present invention is to provide a small scale, e.g., laboratory, apparatus which gives improved simulation of progressive flow or riser chemical reaction, e.g., catalytic hydrocarbon cracking.

Another object of the present invention is to provide an improved chemical reaction process which allows improved simulation of progressive flow or riser chemical reaction, e.g., catalytic hydrocarbon cracking operations. Other objects and advantages of the present invention will become apparent hereinafter.

The present invention involves improvement in the chemical conversion unit and process of U.S. Pat. No. 3,502,574. While this patented unit and process give beneficial results, it has been found that the present chemical conversion unit and chemical conversion process provide even more improved simulation of progressive flow or riser chemical reaction operations to permit more accurate evaluation of, for example, catalysts and process variables.

The present invention is a catalytic reactor which can be small in size and flexible in operation and yet which provides improved simulation of riser reactor operation to permit accurate evaluation of catalysts and chemical processes.

The present chemical conversion unit can be small in size and flexible in operation. This unit comprises a reactor column which discharges into a disengagement vessel. Feed and finely divided catalyst enter in the bottom portion of the reactor column and are transported as a predominately lean fluid up to the disengagement vessel from which product gases are drawn. As an essential characteristic of the present invention, the cross-sectional area of the reactor column does not decrease substantially, preferably is maintained substantially constant, from the point at which the feed and finely divided catalyst first come into contact to the reactor column outlet. Finely divided catalyst, e.g., fluid type catalyst, can be used. Such catalyst particles often have particle sizes in diameters ranging from about 20 to 150 microns. The spent or used catalyst passes downward from the disengagement vessel in a stripper through which a stripping gas rises to remove at least a portion of hydrocarbon products which are carried over with the catalyst. The catalyst is then gas lifted to a regenerator, e.g., in a dispersed fluid state. A regenerating gas, e.g., oxygen-containing gas, is introduced in the bottom portion of the regenerator. This regeneration gas acts to remove, e.g., combust, carbonaceous deposits from the solid catalyst particles which are formed during chemical reaction in the reaction column. Combustion gases are exhausted from the regenerator and can be further sampled and evaluated, if desired. The bottom portion of the regenerator is coupled to the bottom portion of the reactor column to return the catalyst to the reactor column. Thus, the catalyst flows cyclically between the reactor column and the regenerator. A moveable gas inlet extends into a regenerator catalyst standpipe. The height of the inlet within the regenerator standpipe controls division of the catalyst between a fluidized state and a compact state which in turn accurately controls the catalyst flow rate into the reactor column. The bottom of the stripper leads to a catalyst liftline which in turn, leads to the regenerator. Likewise, the bottom of the regenerator standpipe leads to the reactor column. Compact states or phases of solid catalyst accumulate in the lower portions of both the stripper and regenerator standpipe and provide gas seals. The stripper and regenerator standpipe and their portions leading to or connected with the lines passing to the regenerator and reactor column, respectively, can operate without valve control. The fluistatic pressure which develops across the accumulated compact solid phases in both the stripper and standpipe bottoms, and the frictional resistance encountered also affect the catalyst flow rate.

The various components of the present chemical conversion unit can have any suitable configuration. However, because of ease of the fabrication, it is preferred that the reactor column, disengagement vessel, stripper and regenerator be generally circular in cross-section. It is important that the cross-sectional area of the reactor column does not substantially decrease, preferably is maintained substantially constant, from the point at which reactant or feed and finely divided solid catalyst particles first come in contact to the reactor column outlet.

The chemical conversion unit of the present invention may be fabricated from any suitable material of construction. The material of construction used is dependent upon the particular application involved. In many instances, metals and metal alloys such as iron, carbon steel or stainless steel, copper and the like may be used. Of course, the apparatus should be made of a material or combination of materials which is substantially unaffected by the catalyst particles, reactants and the conditions, e.g., temperature and the like, at which the unit normally is operated. In addition, such material or materials should have no detrimental effect upon the catalyst particles or reactants being processed.

Although the present chemical conversion unit and process are applicable to a wide variety of chemical reactions, such unit and process are particularly useful in the catalytic cracking of higher boiling hydrocarbon components to lower boiling materials such as gasoline, hexane, hexene, pentane, pentene, butane, butylene, propane, propylene, ethane, ethylene, methane and the like. Typically, the feed is a petroleum or other hydrocarbon gas oil and may often be a mixture of straight-run and recycle gas oils. Cracking conditions are well known and often include temperatures from about 850° F. to about 1100° F., preferably from about 860° F. to about 1050° F. Other reaction conditions usually include pressures of up to about 100 psig., catalyst to oil ratios of from about 5 to 1 to about 25 to 1, and weight hourly space velocities of from about 3 to about 60. These cracking conditions may be varied depending on the feedstock and catalyst being used and the product wanted. The cracking reaction is generally conducted in the essential absence of added free hydrogen.

As noted above, the catalytic cracking system usually includes a catalyst regeneration zone in which a portion of the catalyst is withdrawn from the cracking reactor and periodically contacted with free oxygen-containing gas in order to restore or maintain the activity of the catalyst by removing, i.e., combusting, carbonaceous material deposited on the catalyst. The combustion gas temperature in the regeneration zone is generally from about 800° to about 1500° F., preferably from about 900° to about 1300° F., and more preferably from about 1150° to about 1250° F. The regenerated catalyst is returned to the cracking reactor.

Any hydrocarbon cracking catalyst having the requisite finely divided size, e.g., particles having an average diameter from about 20 microns to about 150 microns, can be processed in the present chemical conversion unit. For example, various conventional and well known hydrocarbon cracking catalysts in the fluidized form can be so processed. Typical among these conventional compositions are those which comprise alumina, silica, silica-alumina, at least one crystalline alumino silicate having pore diameters of from about 8A. to about 15A. and mixtures thereof. At least a portion of the alumina, silica, silica-alumina and crystalline alumino-silicate may be replaced by clays which are conventionally used in cracking catalyst compositions. Typical examples of these clays include halloysite or dehydrated halloysite (kaolinite), montmorillonite, bentonite and mixtures thereof. These catalyst compositions may also contain minor amounts of other inorganic oxides such as magnesia, zirconia, etc. When the catalyst contains crystalline alumino-silicate, the compositions may also include minor amounts of conventional metal promoters such as the rare earth metals, in particular, cerium.

The various gases employed in conjunction with the present invention, e.g., diluent gas, stripping and second stripping gas and lift gas and the like, other than the oxygen-containing regeneration gas, may be composed of various relatively inert gases, e.g., steam, helium, neon, argon, nitrogen, mixtures thereof and the like. Because of availability and convenience, it is preferred that each of these gases be the same, more preferably, nitrogen. The oxygen-containing regeneration gas should include sufficient oxygen so as to combust the carbonaceous deposits from the catalyst in the regenerator. Because of availability and convenience, the preferred oxygen-containing regeneration gas is air.

These and other aspects and advantages of the present invention will be apparent from the following detailed description and claims, particularly when read in conjunction with the accompanying drawing which is a side elevational view, partially in section, of a laboratory fluid catalytic hydrocarbon cracking unit in accordance with the present invention.

As depicted in the drawing, the reactor column of the catalytic cracking unit is designated generally by reference numeral 8 and comprises a column having substantially a single diameter and, therefore, a substantially single cross-sectional area. In the representative example of the drawing, reactor column 8 is made up of a stainless steel tubing and involves a series of vertical rises and falls connected by smooth u-bends.

A hydrocarbon feed to be cracked to lower boiling components, e.g., a mineral gas oil which will be cracked to useful products such as gasoline, is introduced to the bottom of reactor column 8 at inlet 18, and a diluent gas, such as nitrogen, is introduced at inlet 20 to pass through the reactor with the feed and catalyst. The feed and diluent gas may be pre-heated before entering inlets 18 and 20 if desired. Circulating catalyst, e.g., any finely divided hydrocarbon cracking catalyst, from smooth bend 43 enters the bottom portion of reactor column 8. The catalyst and hydrocarbon are present in reactor column 8 in a predominantly lean fluidized state. Such a predominantly lean fluidized state differs from a dense fluidized state or phase in that such lean state involves substantially less catalyst per unit volume than does the dense phase. The diameter of reactor column 8 remains substantially constant from inlet 18, the point at which feed from inlet 18 first comes into contact with catalyst, to the reactor outlet at disengagement vessel 22. Disengagement vessel 22 is mounted at the other end of reactor column 8 and since the cross-section of the disengagement vessel 22 is larger than that of reactor column 8, the disengagement vessel 22 permits expansion of the gaseous hydrocarbon products coming out of reactor column 8. These gaseous products pass through outlet pipe 24 from the top of disengagement vessel 22 to product collection apparatus, e.g., conventional gas collection means (not shown), to permit sampling and evaluation of the products.

The solid catalyst particles entering the disengagement vessel 22 fall into stripper 26 which is a length of vertical pipe having a smooth bend 27 at the bottom leading to catalyst lift line 30. Bend 27 causes accumulation of a compact phase of solid catalyst particles at the bottom of stripper 26 below inlet line 28, without catching or holding up any catalyst. Stripping gas, e.g., nitrogen, is introduced into stripper 26 at inlet 28 just above bend 27. The nitrogen removes products which may have been carried over into the stripper with the solid catalyst particles. This stripping gas also emerges through outlet pipe 24. The catalyst in stripper 26 which is above inlet 28 is in a fluid phase or condition and the pressure exerted by the catalyst above inlet 28 is proportional to its depth. Thus, as the catalyst flow rate in reactor column 8 increases, the depth of catalyst in stripper 26 above inlet 28 increases to raise the differential pressure between stripper 26 and catalyst lift line 30. The catalyst in the catalyst lift line 30 is in a relatively dispersed fluid state and exerts little, and a relatively constant, back pressure or resistance to flow.

The solid catalyst particles passing from the bottom of stripper 26 enters vertical lift line 30. A lifting gas, such as, for example, nitrogen, is introduced into the bottom of lift line 30 at inlet 32. This gas lifts the solid catalyst through the small cross-section lift line to the top of regenerator vessel 34. The rate at which lifting gas is introduced into lift line 30 through inlet 32 is adjusted so that its velocity is great enough to lift the largest solid catalyst particles utilized, maintaining a dilute phase in the lift line.

Solid catalyst particles which lie in bend 27 at the bottom of stripper 26 are in a compact state and provide a gas seal between reactor column 8 and regenerator 34. The fluistatic pressure across this compact phase of solid catalyst particles controls the rate at which the solid catalyst particles leave stripper 26 and enter lift line 30. The rates of stripping and lifting gases introduced via inlets 28 and 32, respectively, are controlled so that the fluistatic pressure in lift line 30 is less than the pressure within stripper 26. This pressure imbalance results in the flow of solids from stripper 26 into lift line 30. As operation stabilizes, the level of fluidized solid catalyst particles in the vertical section of stripper 26 builds up until the rate of flow of catalyst out of the stripper 26 into lift line 30 is equal to the inlet rate of solid catalyst particles from disengagement vessel 22 to stripper 26.

Regenerator 34 comprises a vertical pipe 35 on the top of which is located a large cross-section vessel 36 having, as shown, a 60° cone on its bottom and a 120° cone on its top. An oxygen-containing regenerating gas, such as air which combusts or burns carbonaceous deposits from the catalyst, is introduced into the bottom of regenerator 34 at inlet 38. This gas from inlet 38 and the gas entering moveable inlet 44 maintain the solid catalyst particles within regenerator 34 in a fluidized state during which the catalyst is regenerated, for example, by removing, e.g., combusting, coke from it which has formed during the catalytic cracking of hydrocarbons in reactor column 8. The resulting combustion of flue gas passes through baffles 39 and 39a which are mounted within vessel 36 to separate solids from the gas. Vessel 36 reduces the velocity of the gas, allowing settling of the solid catalyst particles. The flue gas is carried away by outlet pipe 40, which emerges near the top of vessel 36, above baffles 39 and 39a. Outlet pipe 40 carries the flue gas to other processing equipment (not shown) to permit sampling and evaluation, as desired.

Transfer line 42 couples the bottom of regenerator 34 to the bottom of reactor column 8. The bottom of transfer line 42 includes a smooth bend 43 to enable connection to the reactor. Bend 43 causes accumulation of a compact phase of solid catalyst at the bottom of transfer line 42, without catching any catalyst. Second stripping gas, such as nitrogen, is introduced into transfer line or standpipe 42 through moveable inlet 44, which passes from the top of vessel 36 through regenerator 34 into transfer line 42. This second stripping gas strips the air from the catalyst, and the resulting gas leaves the system at outlet 40.

Within transfer line 42 and regenerator 34, dense fluidized catalyst exists above the lower end of moveable inlet 44. Since moveable inlet 44 can be moved vertically to adjust its depth within transfer line 42, the depth of this fluidized phase can be controlled from the position of inlet 38 to the maximum insertion depth of moveable inlet 44. Below moveable inlet 44 a compact phase accumulates due to smooth bend 43 and forms a gas seal. As moveable inlet 44 is raised, the depth of the fluidized phase is decreased, and the depth of the more compact phase in smooth bend 43 is increased. Thus, as moveable inlet 44 is raised, the pressure differential between generator 34 and reactor column 8 is reduced and the frictional resistance to flow caused by the compact phase is increased.

Solid catalyst particle flow through the system is due to the pressure differentials across the compact catalyst phases which accumulate in smooth bends 27 and 43. When moveable inlet 44 is raised above inlet 38, the compact phase in smooth bend 43 is at its maximum size and the minimum pressure difference exists across the compact phase catalyst in smooth bend 43. This pressure differential is conveniently less than that required to cause catalyst flow. As moveable inlet 44 is lowered below inlet 38, the size of the compact phase decreases, the depth of the dense fluidized phase increases and as a result the pressure differential increases, and catalyst commences to flow from transfer line 42 into reactor column 8.

Within stripper 26 the catalyst level also varies with the depth of moveable inlet 44. When moveable inlet 44 is lowered, the catalyst flow rate increases and as a result the catalyst level in stripper 26 rises and, thus, the pressure differential across the compact catalyst phase in smooth bend 27 increases. As a result, the catalyst flow rate through stripper 26 increases to keep pace with the flow rate through regenerator 34.

The substantially single cross-section of reactor column 8 results in improved simulation of the operation of a riser reaction system. The reactor column can have a small size usable, for example, in laboratory operations. For example, a reactor column 8 can have a total length ranging from about 5 inches to about 30 feet, preferably from about 1 foot to about 20 feet. The inside cross-sectinal area of reactor column 8 can range from about 0.001 in.$^2$ to about 1 in.$^2$, preferably from about 0.01 in.$^2$ to about 0.50 in.$^2$.

The maximum height of the chemical conversion unit is determined by the height of regenerator 34 and its vessel 36 which must permit the catalyst in pipe 35 to be sufficiently above the outlet of reactor column 8 to provide the required fluistatic pressure differentials. While the height of regenerator 34 is thus dependent upon the height of reactor column 8, a regenerator height of about 15 feet above the bottom of reactor column 8 is a convenient maximum usable on a small scale apparatus. In this type of equipment the diameter of the transfer line 42 can range from about 0.5 inches to about 2 inches or more.

If desired, the temperature within the apparatus can be controlled at various points, for example, by means of electric heating coils and thermocouples (not shown) around or in reactor column 8, stripper 26, regenerator 34 and transfer line 42.

The following examples clearly illustrate the present invention. However, these examples are not to be interpreted as specific limitations on the invention.

EXAMPLE 1 to 3

These examples illustrate the improved simulation of riser hydrocarbon cracking operations provided by the present invention.

An apparatus similar to that depicted in the FIGURE was used in Example 1. Reactor column 8 was constructed of stainless steel tubing, was circular in cross-section and had an inside diameter of 0.245 inches throughout its length, from hydrocarbon feed inlet 18 to its outlet in disengaging vessel 22, of about 12.5 feet.

The apparatus employed in Example 2 was similar to that used in Example 1 except tht the first 2¼ inches of the reactor, i.e., the 2¼ inches directly above the hydrocarbon feed inlet, had an inside diameter of ⅛ inch.

A third apparatus, used in Example 3, was similar to that used in Example 1 except that the reactor comprised a straight verticle tapered tube. This apparatus is similar in that disclosed and claimed in U.S. Pat. No. 3,502,574. The first or lowermost 2¼ inches of the reactor has an inside diameter of ⅛ inch. This section is followed, in ascending order, by four 7¼ inch lengths of pipes having inside diameeters of 0.364 inch, 0.493 inch, 0.622 inch and 0.824 inch, respectively. The last or uppermost of these sections is truncated and terminates at the underside of the disengaging vessel.

Each of these apparatus was used to catalytically crack the following hydrocarbon feed:

| Gravity, ° API | 26.1 |
|---|---|
| Wt.% Sulfur | 0.929 |
| Wt.% Nitrogen | 0.108 |
| Wt.% Aromatics | 40.1 |
| ASTM Distillation (D-1160) | |
| IBP (° F.) | 472 |
| 50% | 776 |
| 95% | 1001 |

The catalyst employed in each run was a commercially used, cracking catalyst in the form of fine particles having an average diameter of about 50 microns.

The tests were performed at the following conditions:

| | Ex. 1 | Ex. 2 | Ex. 3 |
|---|---|---|---|
| Reaction Temperature, ° F. | 928 | 930 | 933 |
| Catalyst to Oil Wt. Ratio | 9.6 | 7.8 | 7.9 |
| Vol.% Conversion of Feed | 73.2 | 73.2 | 71.5 |

Selected results from thesetests were as follows:

| | Ex. 1 | Ex. 2 | Ex. 3 |
|---|---|---|---|
| Vol.% $C_3$ Olefin in Product* | 6.6 | 8.1 | 6.2 |
| Vol.% Total $C_3$ in Product* | 7.2 | 9.3 | 7.7 |
| Ratio $\frac{C_3 \text{ Olefin}}{\text{Total } C_3}$ | 0.92 | 0.87 | 0.81 |
| Vol.% $C_4$ Olefin in Product* | 9.6 | 8.4 | 8.3 |
| Vol.% Total $C_4$ Product* | 13.2 | 15.8 | 14.3 |
| Ratio $\frac{C_4 \text{ Olefin}}{\text{Total } C_4}$ | 0.73 | 0.53 | 0.58 |

*Yields are based on volume percent of the hydrocarbon feed.

Riser or progressive flow catalytic hydrocarbon cracking tends to minimize adverse secondary reactions, e.g., cracking of light olefins. See, for example, D. P. Bunn, Jr. et al, The Development and Operation of the Texaco Fluid Catalytic Cracking Process, American Institute of Chemical Engineers, Preprint 21A, Sixty-Fourth National Meeting, New Orleans, La., Mar. 16–20, 1969. Thus, riser or progressive flow catalytic cracking of hydrocarbons produces a higher proportion of light, e.g., $C_3$ and $C_4$ olefins, relative to that produced, for example, in fluidized bed catalytic cracking. Therefore, it is clear that the apparatus of the present invention, Example 1, simulates riser hydrocarbon cracking operations more accurately than do the other apparatus.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A catalytic hydrocarbon conversion process comprising:
   a. passing a hydrocarbon feed fluid to be chemically converted and finely divided solid catalyst in a predominantly lean fluidized state through a reaction zone having a lower inlet and an upper outlet, provided that the cross-sectional area of the reaction zone is maintained substantially constant from the first point at which said feed fluid and said catalyst are contacted to said reaction zone outlet;
   b. separating chemical reaction product from the catalyst;
   c. passing a stripping gas through the separated catalyst in a dispersed state to remove products from the separated catalyst while maintaining a first portion of collected catalyst in a compact phase and a second portion of collected catalyst in a dense compact fluidized state;
   d. withdrawing catalyst from said first portion and lifting the withdrawn catalyst in a dispersed fluid state to an elevated regeneration zone;
   e. passing a regenerating gas through said catalyst in said regeneration zone while maintaning the catalyst in a dense fluidized state;
   f. collecting regenerated catalyst below the inlet of the regenerating gas;
   g. passing collected regenerated catalyst through a transfer means to said reaction zone while maintaining a lower portion of collected catalyst in a compact state;
   h. introducing a fluidizing gas into said regenerated collected catalyst through a control means comprising a pipe passing through said regeneration zone to said transfer means and vertically moveable within said regeneration zone and said transfer means to vary the relative amount of fluidized and compact collected catalyst to control the rate at which regenerated catalyst is passed to said reaction zone.

2. The process of claim 1 in which the catalytic chemical conversion comprises cracking a hydrocarbon.

3. The process of claim 2 in which the feed fluid is a petroleum gas oil and in which the chemical reaction product contains gasoline.

4. The process of claim 3 in which the cross-sectinal area of said reaction zone is in the range from about 0.001 in.² to about 1 in.².

* * * * *